United States Patent [19]

Tuneke et al.

[11] Patent Number: 4,570,410
[45] Date of Patent: Feb. 18, 1986

[54] COMPOSITE PLATE AND METHOD OF MAKING SAME

[75] Inventors: Wilhelm Tuneke, Ense-Höingen; Jürgen Weber, Arnsberg, both of Fed. Rep. of Germany

[73] Assignee: Duropal-Werk Ebehr. Wrede GmbH & Co. KG, Arnsberg, Fed. Rep. of Germany

[21] Appl. No.: 638,956

[22] Filed: Aug. 8, 1984

[30] Foreign Application Priority Data

Aug. 13, 1983 [DE] Fed. Rep. of Germany ....... 3329372
Sep. 3, 1983 [DE] Fed. Rep. of Germany ....... 3331842

[51] Int. Cl.$^4$ ............... A47B 13/08; B27M 3/18; B27H 1/00; E04C 2/00
[52] U.S. Cl. .................. 52/811; 52/309.1; 52/309.15; 52/631; 52/783; 108/27; 156/211; 156/212; 428/81; 428/192
[58] Field of Search ........... 52/782, 783, 811, 813, 52/631, 309.1, 309.15; 108/27; 156/211, 212, 267, 154; 428/81, 157, 192

[56] References Cited

U.S. PATENT DOCUMENTS

| | | | |
|---|---|---|---|
| 1,876,330 | 9/1932 | Loetscher | 156/212 X |
| 2,184,971 | 12/1939 | Allen | 156/211 X |
| 2,542,860 | 2/1951 | Clements | 52/813 |
| 2,550,455 | 4/1951 | Davies | 52/309.1 X |
| 2,648,370 | 8/1953 | Beach | 264/322 X |
| 2,717,187 | 9/1955 | Morgan et al. | 52/783 |
| 3,223,056 | 12/1965 | Wilburn | 52/783 X |
| 3,352,080 | 11/1967 | Rondum | 52/811 X |
| 3,606,508 | 9/1971 | Burnes | 52/783 X |
| 3,668,033 | 6/1972 | Evans | 156/212 |

FOREIGN PATENT DOCUMENTS

| | | |
|---|---|---|
| 2129828 | 12/1971 | Fed. Rep. of Germany . |
| 2047213 | 3/1972 | Fed. Rep. of Germany . |
| 7304666 | 2/1975 | Fed. Rep. of Germany . |
| 3131820 | 2/1983 | Fed. Rep. of Germany . |

*Primary Examiner*—Alfred C. Perham
*Attorney, Agent, or Firm*—Karl F. Ross; Herbert Dubno

[57] ABSTRACT

A rounded edge portion of a core of a composite plate is cut away after a laminate has been bonded to the upper surface thereof so that the rounded edge portion can be tilted upwardly. The groove which extends upwardly from a lower portion of the edge is spread in a wedge manner and is filled with a durable filling before the laminate is bent over the edge portion and bonded thereby to simultaneously close the mouth of the groove.

19 Claims, 5 Drawing Figures

COMPOSITE PLATE AND METHOD OF MAKING SAME

FIELD OF THE INVENTION

Our present invention relates to a composite plate and to a method of making same and, more particularly, to the fabrication of composite plates of the type in which a core is laminated at a cover foil, a decorative or protective layer, or some other sheet material is provided along an upper edge with a round bead which also is covered by the foil or layer.

BACKGROUND OF THE INVENTION

It is known to provide composite plates in a laminate construction in which a core is provided with at least one layer and the latter can include a cover layer which is designed to impart a given esthetic nature to the plate and/or is intended for decorative purposes. Rounded edge beads along an edge of the plate are also required in certain applications, e.g. to limit the run-off of water over the edge and the cover layer can extend over the rounded bead.

The plates can be structural elements or decorative elements and can be utilized in building structures or in furniture, cabinetry or the like.

Customarily the core is composed of a low-cost material and itself can be a laminate, composite, e.g. consisting of chipboard or particle board, although other core materials such as natural wood or synthetic resins may also be used.

The outer surface of the core is provided with one or more layers by lamination, generally by gluing or other adhesive bonding to apply a decorative and/or protective layer in the form of a cover foil or sheet.

Composite plates with which the invention is concerned thus include decorative plates such as the high pressure laminates (HPL plates of German industrial standard DIN 16926). Decorative plates or boards from thermoplastic or thermosetting material can also be provided with protective coatings or layers which are glued to the core and which are water and heat resistant.

While the outer surface of the composite plate may be designed for a desired decorative effect and can be provided with a protective covering, the inner surface or the inwardly turned surfaces is generally provided with a synthetic resin foil allowing protection against moisture incursion and the effect of heating.

This foil also should be, therefore, water and heat resistant.

Naturally, in addition to or in place of this protective foil, the underside or inwardly turned surface of the composite plate or board can be provided with a decorative layer or plate, preferably a high pressure laminate plate or sheet.

The composite plates or boards described have been long known in the art and are increasingly finding interest when at least one edge of the board is rounded to form a bead.

Edge rounding and beading is ergonomically of interest and is of interest also for soft-line decor and for other esthetic reasons. Rounded edge beads are also valuable for window sills, roofing, decking and like purposes where, inter alia, a raised but rounded bead may serve to retard water run-off along an edge.

In the composite plate of U.S. Pat. No. 2,648,370 which is provided with an edge bead, the edge portion is a member separate from the core plate and which defines the edge bead and is glued to the core plate. The surfacing plate or foil, which is applied to the previously glued core plate is bent around the edge portion and glued thereto.

Fabrication is difficult for this composite plate and because the edge portion is a separate member, difficulties are often created by misalignment or the like during fabrication. Furthermore, it is difficult to provide the underside of the core plate and the edge portion with a protective foil.

The use of two separate parts for the core plate and the edge portion creates difficulties with respect to flush-fitting of the parts which may result in distortion of the decorative sheet and problems in the transition region between the parts. As a practical matter one is more often than not able to discern in the proper light a discontinuity in the surface.

Similar problems are encountered with the assembly described in U.S. Pat. No. 2,542,860 where a similar relationship prevails.

Another composite plate with an edge bead, as well as a method of making the composite plate, are described in German patent document—Open Application DE-OS No. 31 31 820. It is this earlier system which is the point from which the present invention proceeds.

In this system, the edge portion is formed entirely with the core plate and the shape of the edge portion is given to it by bending a part of the core plate so as to establish the edge bead. The edge and the remainder of the core plate at the outer surface are glued and the decorative sheet or laminate is applied and bent around the edge portion and glued to the latter while extending at the lower edge of the edge portion.

A groove is formed in the underside of the core plate directly adjacent the lower edge of the edge portion and inclines inwardly and upwardly at the upper surface. To avoid distortion of the decorative sheet, the depth of this groove is so dimensioned that a small amount of material of the core plate remains between the end of the groove and the decorative sheet at the upper surface of the core plate. Thereafter, the groove is widened at its mouth in a wedge shape, thereby bending the edge portion relative to the remainder of the core plate to form the edge bead. While the gluing of the decorative sheet at the core plate here poses no problems and no difficulties are encountered with respect to the flush connection between the core plate and the edge portion, because the edge portion is formed as part of the core plate, difficulties are nevertheless encountered both with respect to the mechanical results and the esthetic results. The filling of the groove is visible from the under or inner surface of the slab and from the side and the filling may provide a water droplet groove which is visible from the side. As a consequence, the optical characteristics of the plate, especially as seen from the side, are not generally satisfactory.

The very thin piece of core plate which remains and is bent during the bending of the edge bead upwardly, frequently is distorted and this distortion can be visible under some lighting conditions at the decorative sheet or through the latter.

Finally, mention may be made of the composite plates with rounded edges which are described in German Utility Model DE-GM No. 73 04 666, German Printed Application DE-AS No. 20 47 213 and German Open Application DE-OS No. 21 29 828 in which a groove is horizontally spaced from the edge of the core plate and is cut into the latter and is filled.

These composite plates, however, do not have upstanding rounded edge beads and are directed to attack on other problems and are concerned with significantly different systems from those which concern the present invention.

OBJECTS OF THE INVENTION

It is the principal object of the present invention to provide an improved composite plate having an upstanding rounded edge bead whereby the disadvantages of earlier systems are avoided.

It is another object of this invention to provide an edge bead composite plate having a decorative sheet thereon which can be fabricated more simply and economically than earlier systems and yet has esthetic characteristics which are far more desirable than earlier composite plates.

Still another object of this invention is to provide an improved method of making a composite plate with a projecting rounded edge bead which greatly simplifies fabrication and at the same time produces an esthetically pleasing construction.

SUMMARY OF THE INVENTION

According to the invention, these objects are attained in a composite plate in which the edge portion is separated from the balance of the core plate by an upwardly converging wedge-shaped groove which reaches from a lower portion of the edge portion upwardly and inwardly to the upper surface of the core plate and which contains a filling which, at the upper portion of the core plate is covered either directly by the decorative sheet glued to the core plate or by a very thin remaining piece of core plate and the decorative sheet, and by the rounded edge portion which is deflected to form an edge bead by a wedge inserted into this groove.

According to the invention, the groove extends into the core plate from the lower part of the edge portion, is covered by the decorative sheet there and thus does not appear at the bottom, inner or lower surface of the core plate to create a visual effect. The filling at the edge of the composite plate is covered directly and completely by the decorative sheet so that the plate has an optimum appearance.

The lower surface of the composite plate can remain free from projections and thus water droplets can pass downwardly without interspersion or without falling onto the underside and the underside of the core plate can be completely covered to the edge with a protective foil without any difficulty since the groove is not cut into the underside or inner surface of the core plate.

Preferably at its end at the upper surface of the core plate, the groove may open at a portion which preferably is perpendicular to the upper surface of the core plate. By a groove which is throughgoing in this manner we can provide a perfectly smooth transition between the edge portion and the balance of the core plate so that the optical qualities of the decorative sheet, especially in the transition region between the edge portion and the core plate, are optimal.

This section of the groove can lie at an angle to the balance of the groove and at least this section of the groove and the adjoining portion of the remainder of the groove can be filled with a plastic material which is a hardenable filler while the balance of the groove can be filled by a solid wedge which is driven into it.

Before cutting the groove into the composite plate from the edge, preferably from the lower half of the edge, it is advisable to glue the decorative sheet onto the upper surface of the composite plate and over a portion of the bead. When the groove is cut through, therefore, the bead is held onto the cover sheet which has previously been glued onto the edge portion. To facilitate the clean separation by a throughgoing goove, the aforementioned portion of the groove perpendicular to the upper surface of the core can be formed in the latter inwardly of the edge portion before the decorative sheet is glued to said upper surface and before the remaining groove is cut into the composite plate from the edge. The groove can then be widened, partially filled with the hardenable material for which the underside of the decorative sheet and the walls of the groove can form a mold, before the remainder of the groove is closed by the insertion of a solid member into the mouth of the groove. After the filling has hardened, any projecting portion at the mouth of the groove can be cut away to leave a smooth surface joining the rounded part of the edge portion with the bottom or inner surface of the core, whereupon an overhanging flap of the decorative sheet can be bent over the edge portion and glued to this smooth surface.

According to a feature of the invention, the rounding and inclination of the edge portion should extend only over between 60 and 90%, preferably over only 80%, of the thickness of the core plate so that adjacent the lower edge of the edge portion a ridge remains along which the cutting of the groove can be effected and which can serve as a guide for the cutting of the groove at an inward and upward angle from the edge of the vore plate. In this case, the rounded portion of the edge portion can be set back slightly with respect to the edge of the core plate and with respect to the outermost surface of this edge portion and the ridge. This allows upon widening of the groove, the ridge still to project slightly beyond the edge, a relationship which is advantageous for the subsequent process steps. This permits the protective foil to extend to the end of the ridge so that when the edge of the plate is finished with the projecting ridge milled away or otherwise removed the protective foil will be certain to extend to the corner at which it meets the decorative sheet bent over the edge. An additional step in the bonding of the edge portion of the protective foil is thereby also avoided.

The filling of the groove can be effected with various materials and we preferably use a hardenable material composed at least in part of the same material as the core plate. A wood paste, for example, where the wood particles are derived from the core plate can be utilized.

The solid member which closes the mouth of the groove can also be composed of the same material as the core plate and can project to the end of the ridge with the contour of the edge being finished by a milling, grinding or sanding operation. The filler body and the ridge are thereby made flush with the balance of the edge portion.

Any plastic or hardenable material may be used and the final shaping need not be limited to a milling operation but can embody any other shaping operation suitable for use with the core plate. Of course any projecting portions of the edge portion can then be removed together with projecting parts of the filler body and the ridge. Plastic hardenable materials which can be used include wood particles, synthetic resin hardenable mixtures, and the filler body closing the mouth can be a wedge-shaped piece of wood.

When the decorative sheet is composed of a high-pressure laminate, such as a phenyl fomaldehyde particle-reinforced resin, melamine, etc., it may be shaped around the edge portion by heating to a temperature of 150° C. to 180° C. and glued to the edge of the plate.

One of the advantages of the invention is that the protective foil can be applied to the underside of the core plate and glued completely thereto in a single step prior to the formation of the groove and even prior to application of the decorative plate or sheet to the core plate. However, it is also possible and especially advantageous to glue the protective foil to the underside of the core plate simultaneously with the gluing of the decorative plate at the upper surface of the core plate.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 5:
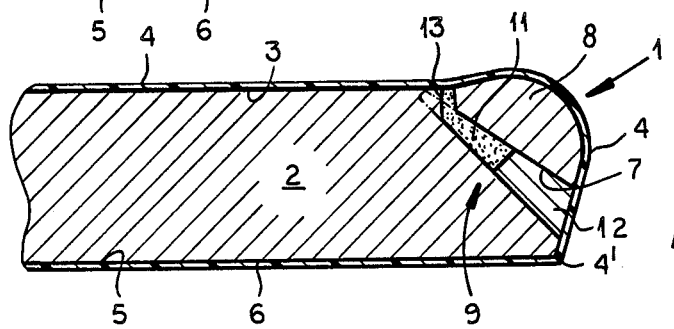
FIG. 5 is another similar view showing the fifth step resulting in the finished composite plate as well as a slightly amended embodiment of the invention in dashed lines.

Referring first to FIG. 5, which shows diagrammatically the final product, the composite plate 1 can be such to comprise a core 2, e.g. of a particle board composition from which the edge bead portion 8 has been previously separated and which, on its upper surface 3, is provided with a decorative sheet 4 which is affixed by gluing or adhesive bonding. The decorative sheet 4 can be a high-pressure melamine or phenol laminate and the glue which is used can be a heat-activated, settable or contact adhesive.

The underside or lower surface 5 of the core 2 is provided with a protective foil 6 which can be a transparent synthetic resin for another high-pressure laminate.

The composite plate 1 is characterized by its optical simplicity and uniformity and freedom from projection or the like which may prevent water run-off, etc. It solves the run-off problem of water droplets along the lower surface 5 of the core 2 in an especially elegant manner in that the edge 4' of the sheet 4 meets the protective foil 6 at an inwardly directed junction so that the sheet 4 itself forms a droplet-shedding edge.

Figure 1:
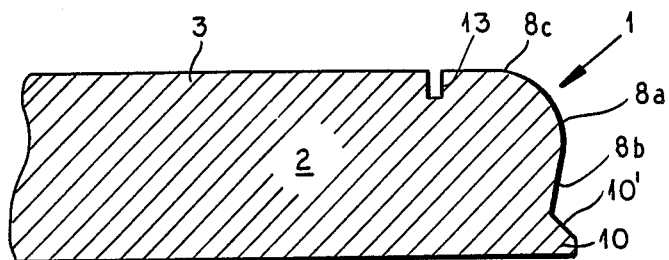
FIG. 1 is a cross-sectional view of a core plate showing a first step in the production of a composite plate in accordance with the present invention.

In a first step (FIG. 1) in the fabrication of the composite plate 1 of the invention, the end of which has been illustrated in FIG. 5, the core 2 is subjected to molding, milling or other forming operation by a toolhead which rounds a portion 8a of the upper surface 3, forms a lip, ledge or ridge 10 adjacent the lower surface 5 of the core 2 and mills a groove portion 13 into the upper surface 3 and perpendicular to the latter. The ridge 10 has an upwardly and inwardly inclined flank 10' which meets an inwardly turned flank 8b running downwardly from the rounded portion 8a.

Figure 2:
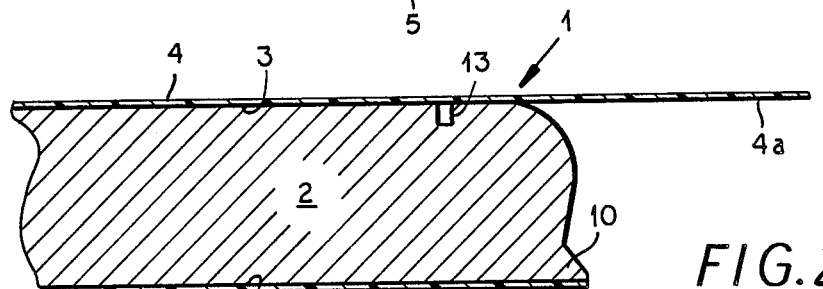
FIG. 2 is a diagrammatically sectional vies illustrating a second step in the production of the composite plate.
Figure 3:
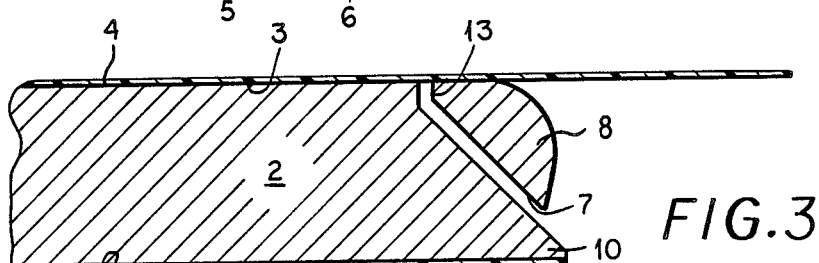
FIG. 3 is a similar view illustrating a third step.

The decorative sheet 4 is then applied to the upper surface 3 by gluing and extends across the groove portion 13 and is bonded to a flat portion 8c of the region between the groove portion 13 and the rounded portion 8a by adhesive bonding in the manner described (FIG. 2). Simultaneously the protective foil 6 is adhesively bounded to the lower surface 5 of the core 2. A flap 4a of the decorative sheet 4 overhangs the edge of the core 2 and has a length sufficient to enable it to be bent over this edge in the manner which will be described.

At the end of the flank 8b and close to the lower surface 5 of the core 2, a groove 7 is milled into the core 2 at an upward and inward inclination until it meets the groove portion 13 to thereby separate the edge portion 8 from the core 2. This edge portion 8 is nevertheless held in place by virtue of the fact that it is bonded to the sheet 4. The groove 7 can be formed at the angle defined by the flank 10' which thus constitutes a guide for the milling of the groove 7.

Figure 4:
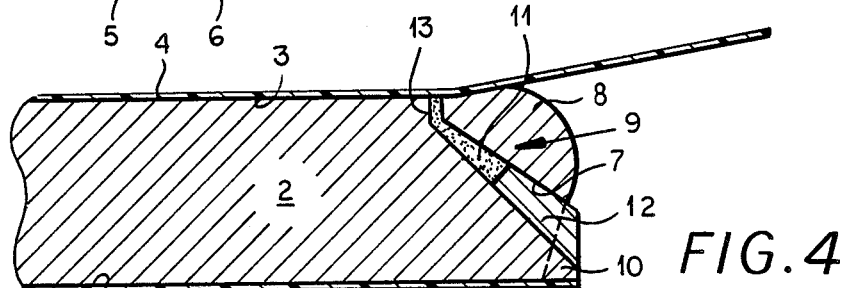
FIG. 4 is another sectional view showing a fourth step.

As initially represented in FIG. 4, the edge portion 8 is swung slightly upwardly or in a counter-clockwise sense to widen the groove 7 which is then upwardly filled with a filling material 9, composed of a stable and durable hardenable filling 11 and a solid wedge 12, which is inserted through the wide mouth of the groove 7 to close this mouth. Extending the flank 8b to the lower surface 5 of the core 2, the ridge 10 and the wedge 12 partly can be milled away, whereupon the flap 4a is glued to the inwardly turned flank 8b of the edge portion 8 which is thus formed (FIG. 5). The filling 11 can be a hardenable material while the wedge 12 can be comprised of the same material as the core 2. The edge portion 8 is bent in place by the filling material 9. Upon insertion, the wedge 12 forces the filling 11 to completely fill the groove portion 13 and lie against the underside of the sheet 4 in the region of this groove portion 13. The shaping and bonding of the sheet 4 are effected at a temperature of this sheet 4 of 150° C. to 180° C.

In omitting the groove portion 13 a second embodiment of the invention is given, which is shown in dashed lines in FIG. 5. Here the groove 7 extends only to a point slightly below the upper surface 3 of the core 2.

We claim:

1. A composite plate comprising:
   a core having an upper and a lower surface and separated from a rounded edge portion by an upwardly and inwardly extending wedge-shaped groove having a wide mouth at an edge of said core proximal to said lower surface and terminating in a narrow groove portion at said upper surface whereby said edge portion is deflected to lie above said upper surface;
   a decorative sheet adhesively bonded to said upper surface and extending across said groove portion, around said edge portion and closing said mouth; and
   a durable filling in said groove extending from said mouth to the end of said groove portion.

2. The composite plate defined in claim 1 wherein said groove portion is opening at said upper surface.

3. The composite plate defined in claim 2 wherein said groove portion is perpendicular to said upper surface.

4. The composite plate defined in claim 1, further comprising a protective foil bounded to said lower surface of said core.

5. The composite plate defined in claim 1 wherein said filling includes a hardenable substance contained in part of said groove including said groove portion and a solid body received in the remainder of said groove including said mouth.

6. The composite plate defined in claim 2 wherein said filling includes a hardenable substance contained in part of said groove including said groove portion and a solid body received in the remainder of said groove including said mouth.

7. The composite plate defined in claim 3 wherein said filling includes a hardenable substance contained in part of said groove including said groove portion and a solid body received in the remainder of said groove including said mouth.

8. The composite plate defined in claim 4 wherein said filling includes a hardenable substance contained in part of said groove including said groove portion and a solid body received in the remainder of said groove including said mouth.

9. A method of making a composite plate with a core having upper and lower surfaces, which comprises the steps of:
rounding an edge of said core at least at an upper part of said core to form an edge portion,
bonding a decorative sheet to said upper surface of said core and said edge portion with a flap of said decorative sheet freely overhanging the edge portion,
forming a groove from a lower portion of said edge towards said upper surface to define said edge portion,
bending said edge portion upwardly to lift the rounded part thereof above said upper surface,
introducing a durable filling into said groove from a mouth thereof towards the end of said groove, and
bonding said flap of said decorative sheet around said edge portion to the bottom surface of said core so that said decorative sheet closes the mouth of said groove.

10. The method defined in claim 9 wherein said rounding of said core extends over only 60 to 95% of the thickness of said core to leave a ridge along said edge at said bottom surface whereby said ridge forms a guide for the formation of said groove.

11. The method defined in claim 10 wherein a solid body is inserted into said mouth of said groove, further comprising the step of cutting away said body and said ridge prior to the application of said flap of said decorative sheet to the surface resulting when said body and said ridge are cut away.

12. The method defined in claim 9 wherein a protective foil is adhesively bonded to said bottom surface simultaneously with the bonding of said decorative sheet to said upper surface.

13. The method defined in claim 9 wherein a groove portion is initially milled in said upper surface perpendicular thereto, said sheet is bonded to said upper surface and to said edge portion across said groove portion prior to the formation of the upwardly and inwardly inclined groove, and the upwardly and inwardly inclined groove meets said groove portion to completely separate said edge portion from said core while leaving said edge portion supported by said plate.

14. The method defined in claim 10 wherein a groove portion is initially milled in said upper surface perpendicular thereto, said sheet is bonded to said upper surface and to said edge portion across said groove portion prior to the formation of the upwardly und inwardly inclined groove, and the upwardly and inwardly inclined groove meets said groove portion to completely separate said edge portion from said core while leaving said edge portion supported by said plate.

15. The method defined in claim 11 wherein a groove portion is initially milled in said upper surface perpendicular thereto, said sheett is bonded to said upper surface and to said edge portion across said groove portion prior to the formation of the upwardly and inwardly inclined groove, and the upwardly and inwardly inclined groove meets said groove portion to completely separate said edge portion from said core while leaving said edge portion supported by said plate.

16. The method defined in claim 12 wherein a groove portion is initially milled in said upper surface perpendicular thereto, said sheet is bonded to said upper surface and to said edge portion across said groove portion prior to the formation of the upwardly and inwardly inclined groove, and the upwardly and inwardly inclined groove meets said groove portion to completely separate said edge portion from said core while leaving said edge portion supported by said plate.

17. The method defined in claim 13 wherein as said filling a hardenable substance is introduced into said groove and fills only a portion of said groove including said groove portion and the remainder of said groove is filled by a solid body.

18. The method defined in claim 14 wherein as said filling a hardenable substance is introduced into said groove and fills only a portion of said groove including said groove portion and the remainder of said groove is filled by a solid body.

19. The method defined in claim 15 wherein as said filling a hardenable substance is introduced into said groove and fills only a portion of said groove including said groove portion and the remainder of said groove is filled by said solid body.

* * * * *